United States Patent [19]

Shimizu et al.

[11] Patent Number: 5,524,103
[45] Date of Patent: Jun. 4, 1996

[54] DISK RECORD MEDIUM, AND METHOD AND APPARATUS FOR RECORDING AND REPRODUCING INFORMATION ONTO AND FROM THE SAME

[75] Inventors: Kikuo Shimizu, Hiratsuka; Shinichi Arai; Takuya Mizokami, both of Odawara; Takeshi Maeda, Kokubunji; Atsushi Saito, Ichikawa, all of Japan

[73] Assignee: Hitachi, Ltd., Tokyo, Japan

[21] Appl. No.: 308,868

[22] Filed: Sep. 19, 1994

Related U.S. Application Data

[63] Continuation of Ser. No. 656,946, Feb. 19, 1991, abandoned.

[30] Foreign Application Priority Data

Feb. 19, 1990 [JP] Japan ..................... 2-37849

[51] Int. Cl.⁶ .......................................... G11B 7/00
[52] U.S. Cl. .................... 369/59; 369/58; 369/47; 369/51; 369/275.4; 360/51
[58] Field of Search ..................... 369/47, 48, 54, 369/59, 58, 111, 109, 44.26, 124, 32, 275.1, 275.3, 50, 51, 41; 360/73.03, 77.08, 77.11, 77.02, 77.06, 77.07, 48, 49, 51

[56] References Cited

U.S. PATENT DOCUMENTS

| | | | |
|---|---|---|---|
| 4,750,059 | 6/1988 | Syracuse | 369/44.26 |
| 4,802,159 | 1/1989 | Nagai et al. | 369/47 |
| 4,819,218 | 4/1989 | Barnard | 369/59 |
| 4,835,757 | 5/1989 | Abiko | 369/54 |
| 4,866,692 | 9/1989 | Saito | 369/59 |
| 4,896,311 | 1/1990 | Ishihara | 369/59 |
| 4,918,677 | 4/1990 | Ashinuma et al. | 369/59 |
| 4,982,110 | 1/1991 | Yokogawa et al. | 369/48 |
| 5,142,521 | 8/1992 | Terashima et al. | 369/50 |
| 5,153,869 | 10/1992 | Yoshimaru et al. | 369/48 X |
| 5,239,533 | 8/1993 | Yoshimaru et al. | 369/51 X |
| 5,278,814 | 1/1994 | Deguchi et al. | 369/47 |

FOREIGN PATENT DOCUMENTS

| | | |
|---|---|---|
| 60-117448 | 6/1985 | Japan . |
| 60-177404 | 9/1985 | Japan . |
| 61-131236 | 6/1986 | Japan . |

OTHER PUBLICATIONS

Oota, Takeo, Optical Information Recording and Reproducing System, English language abstract of Japanese Patent Publication (KOKAI) No. 61-131236, Jun. 18, 1986, vol. 119, p. 512.

Yamamuro, Mikio, Recording Device, English language abstract of Japanese Patent Publication (KOKAI) No. 60-117448, Jun. 24, 1985, vol. 47, p. 401.

Yoshimaru, Tomohisa, Disk Device, English language abstract of Japanese Patent Publication (KOKAI) No. 60-177404, vol. 80, p. 425.

*Primary Examiner*—Aristotelis Psitos
*Assistant Examiner*—Thang V. Tran
*Attorney, Agent, or Firm*—Kenyon & Kenyon

[57] ABSTRACT

In recording and/or reproducing data into and from a disk record medium having a record medium in which a plurality of tracks are arranged radially, the record area is divided into a plurality of zones, and a clock frequency is assigned to each zone. The data recording and/or reproducing are performed according to the clock of the frequency assigned to the respective zone. Each zone is subdivided to include a plurality of tracks, and a clock having a different frequency is assigned to each zone. Each frequency is set in such a manner that the record capacity of the track gradually becomes larger as the zone is nearer to the outer zone.

33 Claims, 8 Drawing Sheets

| CLOCK INFORMATION 34 | TRACK NO. 46 | NUMBER OF CLOCK SWITCHING TRACKS | RECORDING/REPRODUCING CLOCK FREQUENCY 32 |
|---|---|---|---|
| 0 | 0~1023 | 1024 | $f_0$ |
| 1 | 1024~2047 | 1024 | $f_1$ |
| 2 | 2048~3071 | 1024 | $f_2$ |
| ⋮ | ⋮ | ⋮ | ⋮ |
| i | 1024·i ~ 1024·(i+1)−1 | 1024 | $f_i$ |
| ⋮ | ⋮ | ⋮ | ⋮ |

( i : NATURAL NUMBER )

| CLOCK INFORMATION 34 | TRACK NO. 46 | NUMBER FOR CLOCK SWITCHING TRACKS | RECORDING/REPRODUCING CLOCK FREQUENCY 32 |
|---|---|---|---|
| 0 | 0 ~ 1023 | 1024 | $f_0$ |
| 1 | 1024 ~ 2047 | 1024 | $f_1$ |
| 2 | 2048 ~ 3071 | 1024 | $f_2$ |
| 3 | 3072 ~ 3583 | 512 | $f_3$ |
| ⋮ | ⋮ | ⋮ | ⋮ |
| $4i+0$ | $1024(4i+0)-512i$ ~ $1024(4i+1)-512i-1$ | 1024 | $f_{4i+0}$ |
| $4i+1$ | $1024(4i+1)-512i$ ~ $1024(4i+2)-512i-1$ | 1024 | $f_{4i+1}$ |
| $4i+2$ | $1024(4i+2)-512i$ ~ $1024(4i+3)-512i-1$ | 1024 | $f_{4i+2}$ |
| $4i+3$ | $1024(4i+3)-512i$ ~ $1024(4i+4)-512(i+1)-1$ | 512 | $f_{4i+3}$ |
| ⋮ | ⋮ | ⋮ | ⋮ |

( i : NATURAL NUMBER )

DISK RECORD MEDIUM, AND METHOD AND APPARATUS FOR RECORDING AND REPRODUCING INFORMATION ONTO AND FROM THE SAME

This is a continuation of application Ser. No. 07/656,946, filed on Feb. 19, 1991, now abandoned.

BACKGROUND OF THE INVENTION

1. Field of the Invention

This invention relates generally to a disk record medium, a method for recording and/or reproducing information onto and from the same, and a recording/reproducing apparatus for carrying out the method. More particularly, the invention relates to a recording/reproducing method and a recording/reproducing apparatus suitable for realizing a mass storage disk file system.

2. Description of the Related Art

Currently, recording of information in a record medium in the form of an optical disk is accomplished by providing a spiral track or concentric tracks on the optical disk and by forming on the track or tracks pits or domains such as physically varied regions, which can be detected by an optical means or a magnetic means, in association with the information to be recorded. For reproducing the recorded information, an object track is selected from many tracks juxtaposed in a radial direction of the disk, and the physically varied regions are detected.

Although it is actually continuous a spiral track, appears as if a plurality of tracks are arranged radially on the disk. It is therefore regarded, in the present invention, that plural tracks are provided on a disk having a spiral track.

Two methods are hitherto known to record and/or reproduce information in and/or from such a disk record medium. One of the two methods is a CAV (Constant Angular Velocity) method in which recording and/or reproducing is performed while the disk is rotating at a constant angular velocity; and the other is a CLV (Constant Linear Velocity) method in which recording and/or reproducing takes place while the disk is rotating at a constant linear velocity.

According to the former method, although recording and/or reproducing can be performed stably, the record density is low, and the rate of error occurrence or the error frequency during signal reproduction varies between the inner and outer tracks of the disk, that is, there is a difference in quality of signals. According to the latter method, on the other hand, although the record density can be high, the access speed is slow because the rate of rotation of the disk is varied depending on the radial location of a record position to be accessed.

To this end, a solution has been proposed by, for example, Japanese Patent Laid-Open Publication No. 61-131236 (1986). This Japanese publication discloses a method in which the record pit or domain lengths of both the inner and outer tracks are kept constant throughout the entire record region by changing the recording clock frequency according to the linear velocity of the track on the record medium rotating at a constant angular velocity.

This prior art is also exemplified by Japanese Patent Laid-Open Publications Nos. 60-177404 (1985) and 60-117448 (1985).

As mentioned above, in a recording/reproducing apparatus employing a disk record medium which is rotated at a constant angular velocity, the record pit or domain length can be constant at both the inner and outer tracks in the record area by increasing the recording/reproducing frequency at the outer track depending on the linear velocity of the record position. Thus, an increased record capacity of the disk is to be expected.

These prior art references, however, are totally silent about either the record pit or domain length on a disk record medium, or the relation to the recording method. These prior art references are also silent about how the pit or domain length varies from the inner track to the outer track.

It has come to light, from the present inventors' studies, that these factors are important to realize stable reproduction of information. Particularly in a so-called pit-edge record method or a mark-length modulation method in which the front and rear edges of a pit or record domain formed when a signal is defined during recording, it has also turned out that the extent of displacement of the edge-detection position is increased because of possible variation of the pit or domain length, thus deteriorating the detected information.

More specific discussion will now be provided concerning clocks. A clock encounters fluctuation caused by the associated circuits. Assuming that the extent of the variation due to the fluctuation is substantially constant irrespective of the frequency, the higher the frequency is, the greater the influence of the variation relative to the clock width.

Secondly the relation between the provision of a pit and the linear velocity will be discussed. The present inventors conducted an experiment, the results of which indicate that the rising and lowering temperature gradients, which may be caused during the forming of the pit according to the characteristics of a record medium, depend on the linear velocity. The present inventors further conducted another experiment, in which pits were formed at a variety of linear velocities and the formed pits were then detected by using a detecting window. The second experiment shows that the higher the linear velocity is, the more the displacement extent of the position of an edge detection signal relative to the window margin was increased. In other words, as shown in FIG. 9 of the accompanying drawings, if the record clock frequency is varied so as to provide the same record pit length on both the inner and outer track sides of the record area, then the ratio $\Delta\Phi/W$ of the extent of displacement $\Delta\Phi$ to the window margin W shows a tendency to rise from the inner track toward the outer track.

Thus, as the record position is nearer to the outer track, the the ratio $\Delta\Phi/W$ is increased. Consequently, in the case the recording is carried out with the pit lengths constant, the displacement of the detection signal appearing position with respect to the detecting window is increased to such an extent that a detection signal cannot be received in the detecting window. As a result, a reading error occurs which deteriorates the quality of the signal so that stable reproducing cannot be realized.

Furthermore, changing the clock for each and every track requires both a means for generating many different clocks so as to meet with many tracks and a means for switching clocks for every track, thus making the circuits complex. Additionally, a special area is needed for the clock switching position of every track, thus requiring a complex control and reducing the entire record area.

SUMMARY OF THE INVENTION

It is therefore a first object of this invention to provide a recording and reproducing method in which the record density on the outer track of a disk record medium can be improved, while enabling stable reproducing. Thus recording and/or reproducing of massive information can be attained with high reliability.

A second object of the invention is to provide a recording and reproducing apparatus for carrying out the above-described recording and reproducing method, without making associated circuits complex.

According to a first aspect of the invention, there is provided a method for recording and/or reproducing data into and from a disk record medium having a record area in which a plurality of tracks are radially arranged, each of the tracks being adapted to have a physically varied region to record data, said method comprising: dividing the record area radially into a plurality of zones; assigning different clock frequencies one to each of the zones in such a manner that the clock frequencies become higher from the inner zone toward the outer zone; and performing the data recording and/or reproducing according to clocks of the frequencies assigned to the respective zones.

Each clock frequency is set to such a value that the circumferential length of a physically varied region to be formed on the track of the same precedence in each zone for the data of the same pattern becomes longer as the zone is nearer to the outer periphery of the medium.

The zones include a plurality of kinds of zones, the individual zone of each kind including a different number of tracks. The zone including a first number of tracks is located contiguous to a zone having a number of tracks which may be smaller than said first number.

According to a second aspect of the invention, there is provided a method for recording and/or reproducing data into and from a disk record medium having a record area in which a plurality of tracks are radially arranged, said method comprising: dividing the record area into a plurality of zones; assigning different clock frequencies one to each of the zones in such a manner that each track has a record capacity relatively larger than the record capacity of the inner adjacent track; performing the data recording and/or reproducing according to clocks of the frequencies assigned to the respectively zones.

According to a third aspect of the invention, there is provided a method for reproducing data from a disk record medium by detecting a physically varied region formed on the disk record medium, comprising: detecting, with a detecting window, a signal to be generated from an edge of the physically varied region; and varying a reproduction clock frequency in such a manner that the ratio $\Delta\Phi/W$ of displacement $\Delta\Phi$ of the detection signal appearing position in the detecting window to a window margin W is kept substantially within a constant range, irrespective of the radial position of the record medium.

According to a fourth aspect of the invention, there is provided an information processing apparatus for performing data recording and/or reproducing into and from a disk record medium having a record area in which a plurality of tracks are arranged radially, said apparatus comprising: means for rotating the disk record medium at a constant angular velocity; a clock controlling means for dividing the record area into a plurality of zones according to the radial position of said clock controlling means and for assigning clock frequencies one to each of the zones in such a manner that the clock frequencies become higher from inner zone toward the outer zone; and at least one of information recording and reproducing means, said information recording means being operable to perform the data recording according to the clock frequencies assigned to the respective zones, said information reproducing means being operable to perform the data reproducing according to the clock frequencies assigned to the respective zones.

The clock controlling means has a function for varying and setting the clock frequency of each zone in such a manner that the circumferential length of a physically varied region to be formed on the track of the same precedence in each zone for the data of the same pattern becomes longer as the zone is nearer to the outer periphery of the medium.

The clock controlling means has a function for outputting, according to a code given to and identifying the track to be accessed, clock information representing the zone to which the track to be accessed belongs, and a function for outputting, based on said clock information, a clock of a frequency corresponding to the track to be accessed.

The clock-information outputting function has a conversion table in which the code identifying the individual track is associated with the clock information indicating the zone to which the individual tracks belong.

The conversion table has the individual clock frequencies such that each track has a record capacity becoming larger as the track is nearer to the outer zone, and wherein said conversion table outputs the clock information designating a value such that the circumferential length of the physically varied region formed on the track of the same precedence in each zone for the data of the same pattern becomes longer as the zone is nearer to the outer zone.

In this invention, data recording and/or reproducing are performed by varying the recording/reproducing clock frequency in such a manner that the record capacity of a single track is increased as the record position in the record area of the disk recording medium is displaced from the inner track to the outer track while the disk record medium is rotating at a constant angular velocity, namely, by varying the clock frequency so as to increase gradually toward the outer track. Therefore it is possible to increase the record capacity of the disk record medicare even though the angular velocity of the record medium is constant.

Further, the recording/reproducing clock frequency is set in such a manner that the circumferential length of a data recording pit or a record domain. Namely, in reproducing data by setting a detecting window and by detecting a signal derived from the edge of the pit or domain to be recorded in the disk record medium, the recording/reproducing clock frequency is varied in such a manner that the ratio $\Delta\Phi/W$ of displacement $\Delta\Phi$ of the detection signal appearing position to the window margin W both the inner and outer tracks of the disk record medium is kept within a substantially constant range. If the window margin W is deemed as the length on a track, the length on the outer track is larger than that on the inner track so that an adequate read margin can be secured even on the outer track, thus minimizing read errors. Therefore a stable signal quality at every record position on the inner and outer tracks is guaranteed to realize stable and highly reliable reproducing.

Furthermore in this invention, the record area of the disk record medium is divided into a plurality of zones radially contiguous to one another, and a recording/reproducing clock is assigned to each zone. Data recording and/or reproducing are performed by the clock assigned to each zone. Therefore it is possible to control the clock easily with a simple circuit construction.

In this case, the recording/reproducing clock for each zone is assigned with varying the frequency in such et manner that the record capacity for a track is increased track after track toward the outer zone. Regarding the tracks of the same order of precedence in each zone, the frequency is set in such a manner that the circumferential length of a data recording pit or of a record domain is increased gradually toward the outer zone.

According to this invention, because the disk record medium can be rotated at a constant angular velocity, no time for stabilizing the rate of rotation of the disk record medium is needed to locate the optical head. Also at every record position on the inner and outer tracks, a stable signal quality is guaranteed. The ratio of displacement $\Delta\Phi$ of the recording/reproducing clock switching position can be kept substantially constant, and therefore stably readable high-density record can be realized.

DETAILED DESCRIPTION

Figure 1:
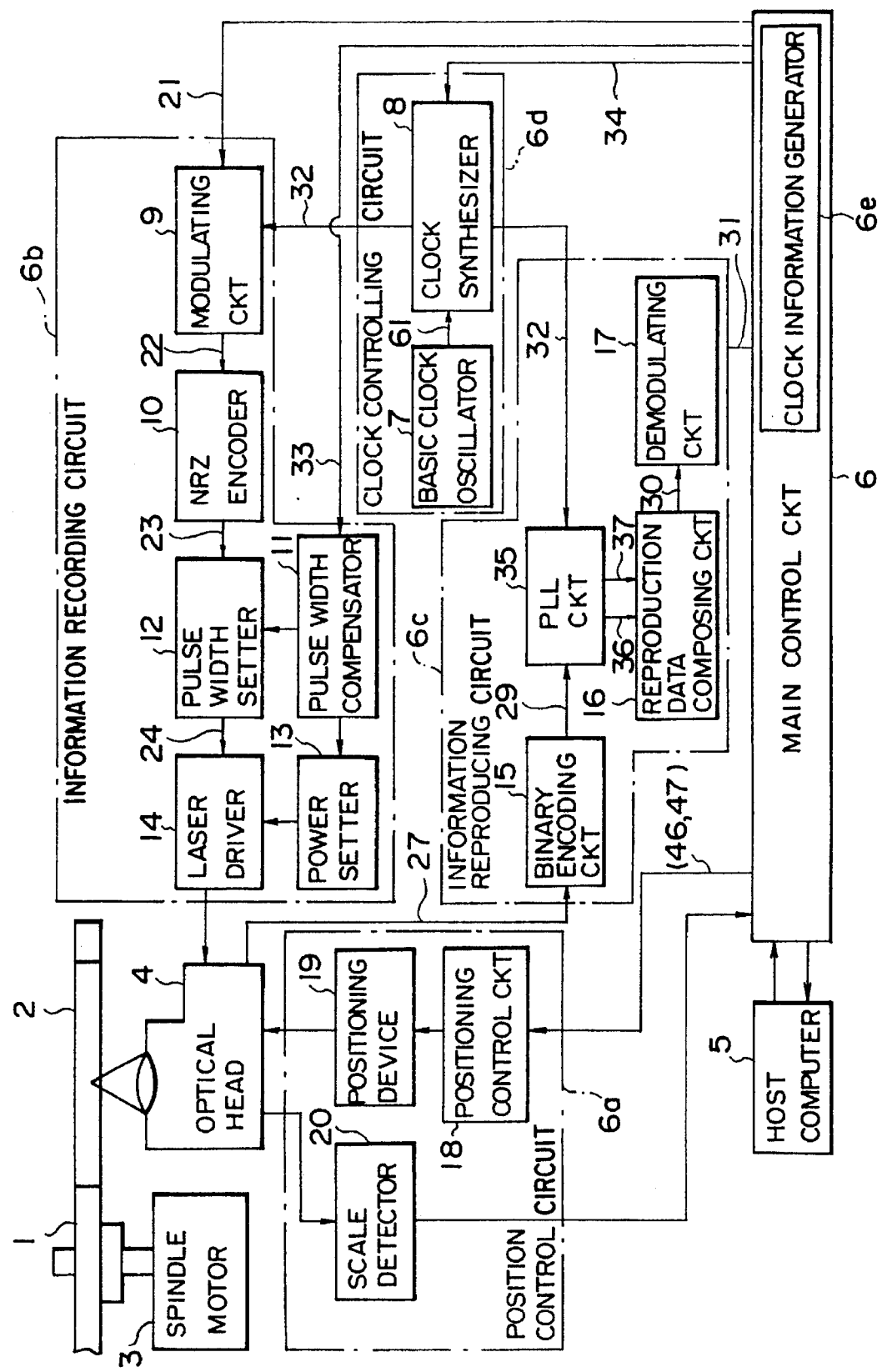
FIG. 1 is a block diagram showing the basic construction of one form of an optical disk system embodying the present invention.

The principles of this invention are particularly useful when embodied in an optical disk system as shown in FIG. 1.

As illustrated in FIG. 1, the optical disk system generally comprises an optical disk medium 1 having a record area 2, a spindle motor 3 for rotating the optical disk medium 1, an optical head 4 for performing writing, reading and erasing information to and from the optical disk medium 1, a main control circuit 6 for controlling the entire system, a position controlling circuit 6a operable under the control of the main control circuit 6 to control the positioning of the optical head 4, an information recording circuit 6b, an information reproducing circuit 6c, and a clock controlling circuit 6d.

The position controlling circuit 6a includes a positioning device 19 for positioning the optical head 4 in an object position, a positioning control circuit 18 for controlling the positioning device 19, and a scale detector 20 for detecting an access position of the optical head 4.

The information recording circuit 6b includes a modulation circuit 9 for modulating data 21 to be written into a code 22 of run-length-limit code system such as a 2–7 modulation code, an NRZ encoder 10 for converting the modulated code 22 into an NRZ (Non-Return-to-Zero) code, a pulse width setter 12 for setting, while compensating, a writing pulse width for the NRZ code 23 to set a record code 24, a laser driver 14 for driving a laser element (not shown in FIG. 1) based on the record code 24 to transmit laser light to the optical head 4, a recording pulse width compensator 11 for providing an instruction to the pulse width setter 12 to compensate the pulse width based on control information 33 from the main control circuit 6, and a power setter 13 for setting the power of the laser driver 14 commensurate with the compensation.

The information reproducing circuit 6c includes a binary encoding circuit 15 for binary-encoding a reproduction signal 27, detected from an optical detector (not shown) in the optical head 4, to obtain a reproduction code 29, a PLL (phase-locked-loop circuit 35 for outputting a synchronous code 36 and a detecting clock 37 in synchronism with the reproduction code 29, a reproduction data composing circuit 16 for composing from the synchronous code 36 a code 30 of the reproduction data, and a demodulation circuit 17 for demodulating data 31 from the code 30.

The clock controlling circuit 6d includes a basic clock oscillator 7 for generating a basic clock, and a clock synthesizer 8 for generating an object recording/reproducing clock from the basic clock based on the set clock information. The clock controlling circuit 6d also includes a clock information generator 6e for outputting to the synthesizer 8 clock information 34 to designate a recording/reproducing clock assigned to every one or more tracks in association with the access position. The clock information generator 6e may be provided as one of the functions of the main control circuit 6.

Figure 2:
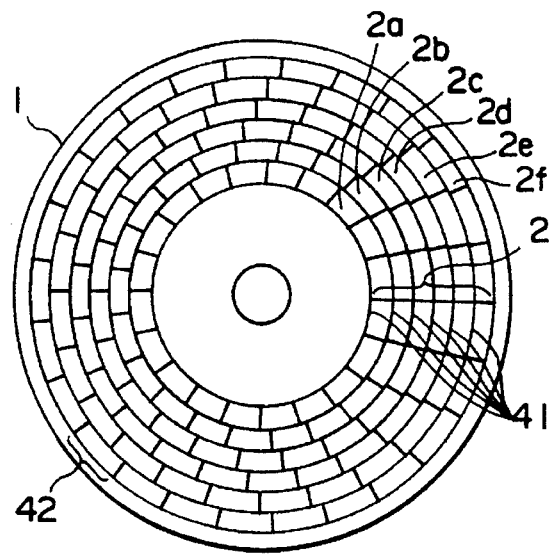
FIG. 2 is a diagram schematically showing the general format of an optical disk medium.
Figure 3:
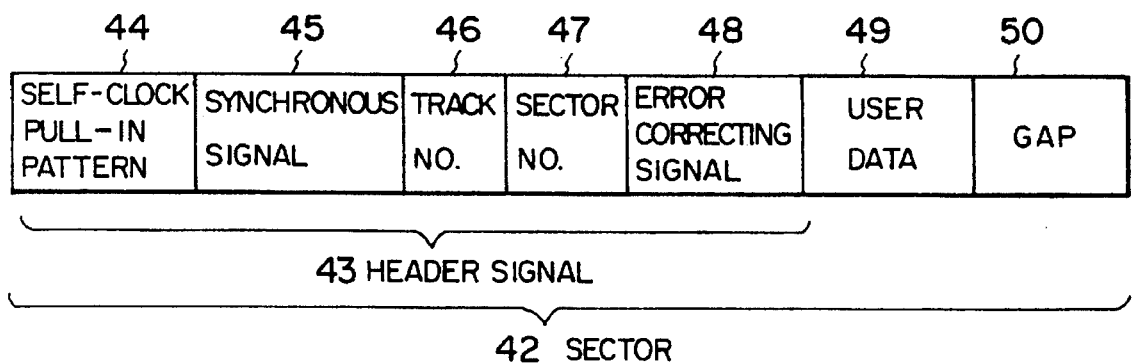
FIG. 3 is a diagram schematically showing the construction of a sector.

The record area 2 of the optical disk medium 1, as shown in FIG. 2, is divided into a plurality of zones 2a–2f radially contiguous to one another. In each zone 2a–2f, a plurality of tracks are provided where information is recorded and/or reproduced. Further, the optical disk medium 1 has a recording/reproducing clock frequency switching position 41, at each border of adjacent zones 2a–2f, for every several tracks. In the clock frequency switching position 41, the number of sectors 42 is increased by one from the number of sectors in the inner adjacent track.

Regarding the tracks of the same radial precedence order in each zone 2a–2f of the optical disk medium 1, the circumferential length of a data record pit or a data record domain formed thereon is longer as the zone to which the pit or domain belongs is located outer on further from a center of the disk.

The optical disk used in this embodiment is of a write-once-read-many type.

Although not illustrated in the drawings, the main control circuit 6 includes, for example, a central processing unit (CPU), a ROM (Read Only Memory) for storing a program of the CPU, and a RAM (Random Access Memory) for storing various kinds of data. The main control circuit 6 has, as one of its functions, the function of the clock information generator 6e of the clock controlling circuit 6d as described above. In order to realize this function, the main control circuit 6 stores in the ROM or RAM a conversion table of FIG. 10 or FIG. 15 so that the CPU can read the associated clock information 34 from the ROM or RAM based on information from a host computer 5.

Figure 12:
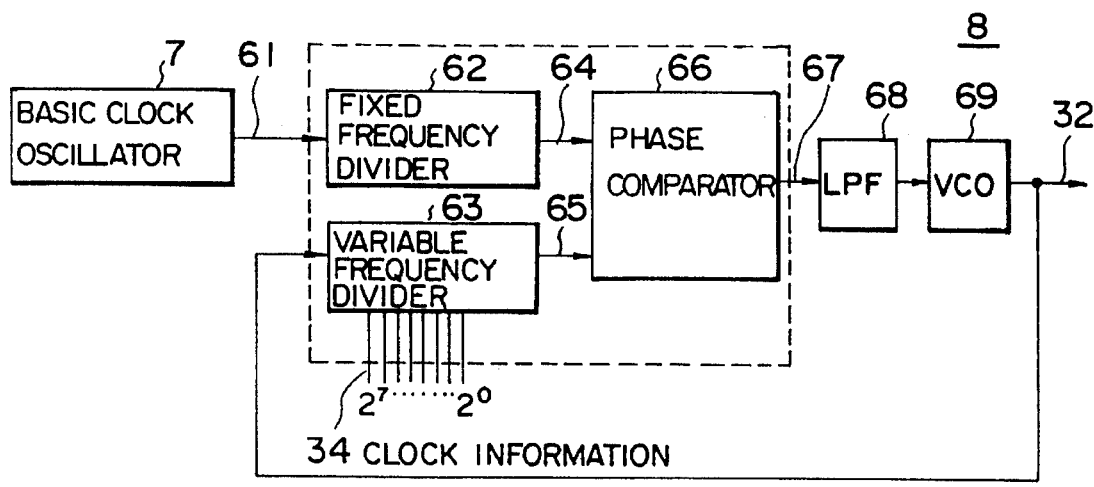
FIG. 12 is a block diagram of one form of a clock synthesizer employable in the present invention.

As shown in FIG. 12, the clock synthesizer 8 includes, for example, a fixed frequency divider 62 for dividing the frequency of a basic clock 61 from the basic clock oscillator 7 to output a reference clock 64, a variable frequency divider 63 for dividing the recording/reproducing clock 32, which is an output of the synthesizer 8, according to a to-be-divided frequency set by the clock information 34 from the main control circuit 6, a phase comparator 66 for comparing the frequency of the variable frequency-divided clock 65, which is outputted by the variable divider 63, with the reference clock 64 to detect an error and for controlling an output signal 67 in such a manner that the clock 65 and the reference clock 64 coincide with each other, a low-pass filter (LPF) 68, and a VCO (Voltage Controlled Oscillator) circuit 69 for oscillating a frequency commensurate with the voltage of the output signal 67.

The output of VCO circuit 69 is provided as the recording/reproducing clock 32 and is fed back to the variable frequency divider 63, as described above.

Each of the modulation circuit 9 and the NRZ encoder 10 may, alternatively, be of a known circuit construction.

Figure 13:
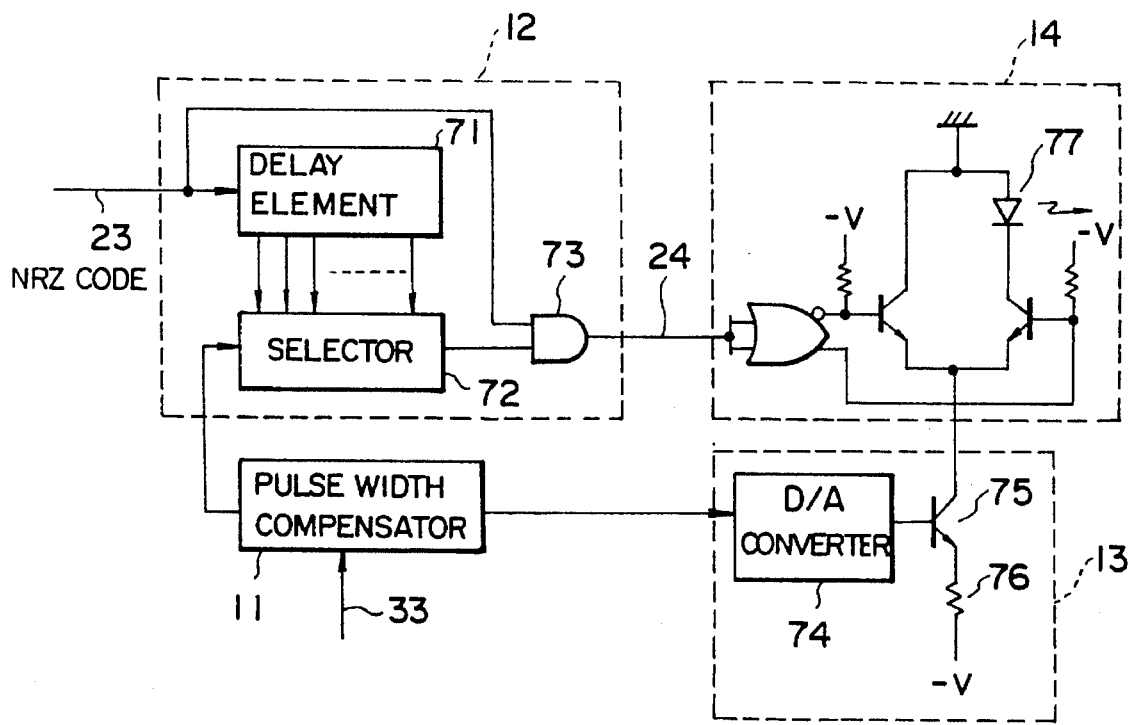
FIG. 13 is a block diagram of one form of a record compensating circuit employable in the present invention.

As shown in FIG. 13, the pulse width setter 12 includes, for example, a delay element 71 having a plurality of output taps from which output signals are provided with given delay times, a selector 72 for selecting an output from the output taps of the delay element 71 according to a compensating instruction from the pulse width compensator 11, and an AND circuit 73 for ANDing the output from the selector 72 and the NRZ code 23 input to the delay element 71.

As shown in FIG. 13, the laser driver 14 is provided, for example, in the form of a current switch configuration, in which switching is effected in response to the value of the record code 24, to energize or deenergize a semiconductor laser 77.

The power setter 13 includes a transistor 75 connected in series to the semiconductor laser 77 for setting the driving current of the semiconductor laser 77, a resistor 76 connected in series with the transistor 75, and a D-A converter 74 for converting the value of an instruction from the pulse width compensator 11 from a digital form to an analog form to set the base potential of the transistor 75.

The pulse width compensator 11 comprises, for example, a ROM (not shown). In this ROM, both an instruction for selecting the amount of compensation of the pulse width to the selector 72 and the value of an input bit instruction to the D-A converter 74 are stored with the control information 33 as an address.

Each of the binary encoding circuit 15, the PLL circuit 35, the reproduction data composing circuit 16, etc. may also be of a known circuit construction. These known circuit constructions are described in, for example, Japanese Patent Laid-Open Publication No. 63-53722 (1988).

An information recording and reproducing method carried out by using the optical disk system of FIG. 1 will now be described.

Prior to describing the recording and reproducing operations, the principles of the pit-edge record method adopted in present invention will be described.

Figure 4:
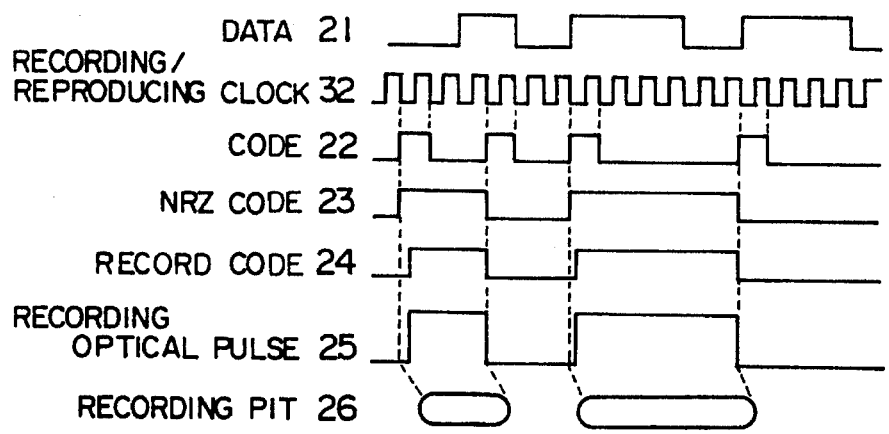
FIG. 4 is a diagram of various waveforms for data recording.
Figure 5:
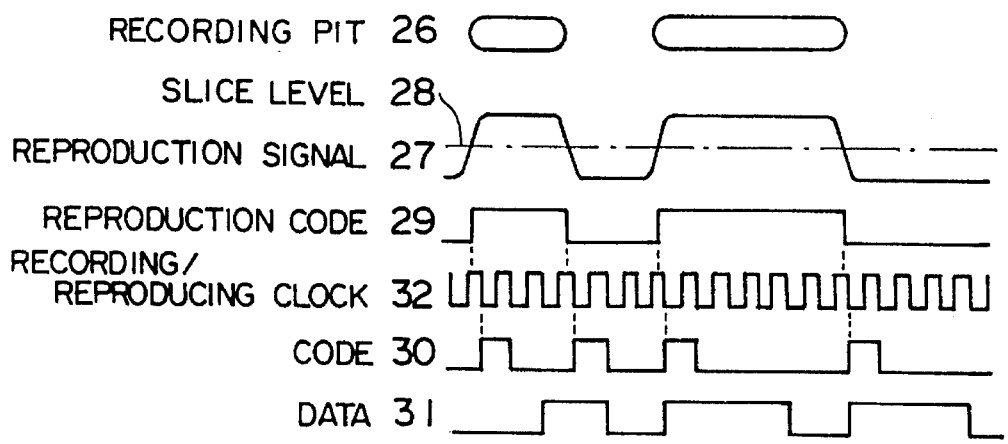
FIG. 5 is a diagram of various waveforms for data reproducing.

FIG. 4 is a diagram of various waveforms showing the process of the change of a signal in the course of the modulation and conversion of the signal data into codes for recording on the optical disk, and also showing pits to be formed on the optical disk. FIG. 5 is a diagram of various waveforms showing the manner in which information from the pits recorded on the optical disk is reproduced and is demodulated to restore the original data.

In FIG. 1, the optical disk medium 1 is driven by the spindle motor 3 for rotation at a constant angular velocity, during which data is to be read and written.

As shown in FIG. 1, the data 21 to be recorded is modulated into a code 22 by the modulation circuit 9. In the illustrated embodiment, this encoding is performed by the 2–7 modulation; however, it should by no means be limited to this specific way. The code 22 is converted into an NRZ code 23 by the NRZ encoder 10.

Assuming that the NRZ code 23 is recorded on the optical disk medium 1, generally a pit is formed longer than the irradiated record width. This is because the heat of laser light emitted from the semiconductor laser 77 in the laser driver 14 is propagated in the record film so that the temperature of the record film even at portions not exposed to the record pulse light rises over the melting point of the record film. This results in an undesired extension of the pit. Further, depending on the relation between the melting point of the record film and the irradiation power, a pit shorter than the irradiated record width will sometimes contrarily be formed.

However, in order to make the length of a record pit 26 correspond to the length of the NRZ code 23, a record code 24 is used whose pulse width has been preliminarily compensated (in the case of FIG. 4, shortened) prior to recording. Also compensation is made to the power of a record light pulse 25 commensurate with the linear velocity of the optical disk medium. The record light pulse width and the record light power are set under the control from the pulse width compensator 11 by using the pulse width setter 12 and the power setter 13, respectively.

Thus, the laser driver 14 drives the semiconductor laser 77 to form a record pit 26 on the disk. Specifically, the front and rear edges of the thus formed pit 26 are associated with "1" of the 2–7 modulation code and the data is recorded on the optical disk medium 1.

The manner in which the data 31 is demodulated from the record pit 26 will now be described with reference to FIG. 5.

Reflected light from the optical disk medium 1 when irradiated by laser light varies in amount, depending on the presence or absence of the record pit 26, so that a reproduction signal 27 can be obtained as an analog signal. The binary encoding circuit 15 encodes the reproduction signal 27 into a binary code, using a given slice level 28, so that a reproduction code 29 can be obtained.

In an alternative way, the binary reproduction code 29 can be obtained by differentiating the reproduction signal 27 two times and detecting its zero cross point.

From the rising and falling edges of the reproduction code 29, pulses corresponding thereto are generated for obtaining a code 30. The code 30 is input to the demodulation circuit 17 which is operable reversely to the modulation circuit 9, to realize the data 31.

In FIG. 5, the recording/reproducing clock 32 is shown for comparison with FIG. 4. Practically, however, a detecting clock 37 synchronous with the reproduction code 29 is generated (FIG. 1) as the code 30 is reproduced from the reproduction code 29.

The length of the pit formed on the optical disk medium 1 will now be discussed.

In the case of 2–7 modulation, there are six different lengths of record pits; here the length of the shortest pit is obtained. The shortest pit length $t_0$ on the innermost track is expressed by the following equation:

$$t_0 = 2\Pi \cdot (R + 0 \cdot N \cdot d) \cdot 1.5/\{Z \cdot (n+0)\} \ (\mu m)$$

where Z is the number of all bits of the sector 42 of the optical disk medium 1, d$\mu$m is a track pitch, N is the number of tracks for which the recording clocks are switched, R$\mu$m is the radius of the innermost track, and n is the number of sectors included in the innermost track.

Thus, the shortest pit length $t_1$ on i-th recording/reproducing clock switching position is expressed by the equation:

$$t_1 = 2\Pi \cdot (R + i \cdot N \cdot d) \cdot 1.5/\{Z \cdot (n+i)\} \ (\mu m)$$

At the recording/reproducing clock frequency switching position, this shortest pit length on the outer track becomes larger than on the inner track under the following condition:

$$N \cdot d \cdot n - R > 0$$

For example, assuming that N=1024, n=51 and R=70 mm in the optical disk medium 1 formatted with the track pitch d=1.5 $\mu$m, the length of the individual pit having the same record information at the clock switching position is linearly increased from the inner track toward the outer track.

Figure 6:
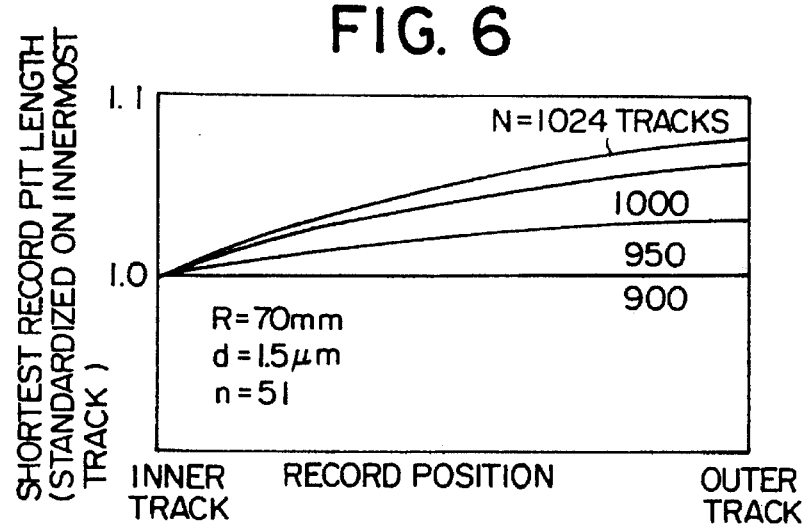
FIG. 6 is a graph showing the change of a shortest record pit length at a record/reproducing clock switching position.

Assuming that the track pitch d, the radius R of the innermost track and the number n of the sectors 42 are constant, it is possible to control the increase of the record pit length, only by varying the number N of the tracks for which the recording clocks are switched. The change of the shortest pit length at the recording/reproducing clock switching position 41 is shown in FIG. 6.

To the contrary, as disclosed in Japanese Patent Laid-Open Publication No. 61-131236 (1986), if the shortest pit length is constant in the record area on both the inner and outer tracks, it will be more difficult to obtain an adequate margin for reading, on the outer track, as compared with the inner track. This phenomenon, which is the start of this invention, will be discussed more in detail.

Figure 7:
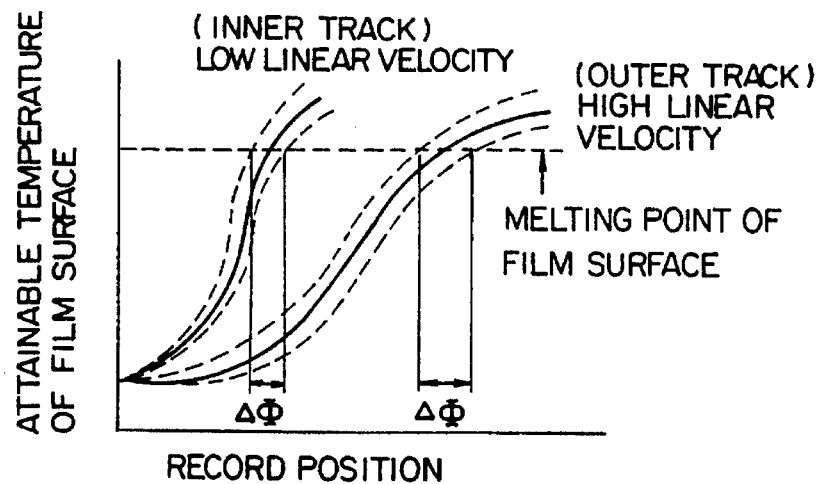
FIG. 7 is a graph showing curves of temperatures which a record film surface reached.

Since the optical disk medium 1 is rotating at a constant angular velocity, there is a difference in linear velocity between the inner and outer tracks of the record area. Therefore, the curve of reached temperature of the film surface while a pit is formed by irradiating record laser light to the optical disk medium 1 varies depending on the linear velocity, as shown in FIG. 7. Also, when irradiating record laser light, the reached temperature curve of the film surface varies as indicated in dotted lines in FIG. 7 due to the ununiformity of the record film, the linear velocity fluctuation and other causes. As the result of this variation, the pit forming position sways so that the record position having the higher linear velocity and a gentle gradient of reached temperature curve, namely, the record position on the outer track is subject to large variation $\Delta\Phi$ of the pit length. The same thing can be said for the rear edge of the formed pit.

For comparison with the illustrated embodiment, the length of a pit formed in the prior art method will now be discussed.

Figure 8:
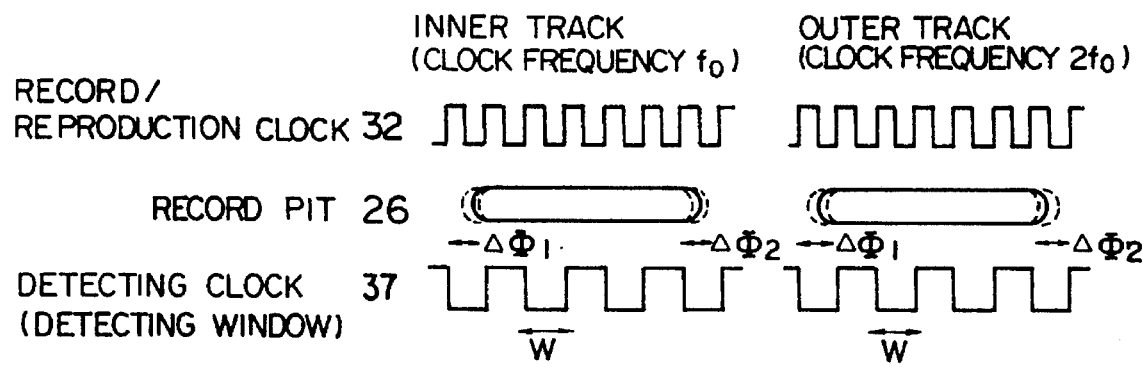
FIG. 8 is a diagram of various waveforms showing the variation of a record pit.

In the prior art, as shown in FIG. 8, the frequency of the recording/reproducing clock 32 varies in proportion to the linear velocity of the record position to form a record pit 26 in such a manner that the linear density is constant throughout the entire record area. In FIG. 8, the waveform of the inner track of the clock frequency $f_0$ and the waveform of the outer track (clock frequency $2f_0$) of the linear velocity double as high as that of the inner track.

Figure 9:
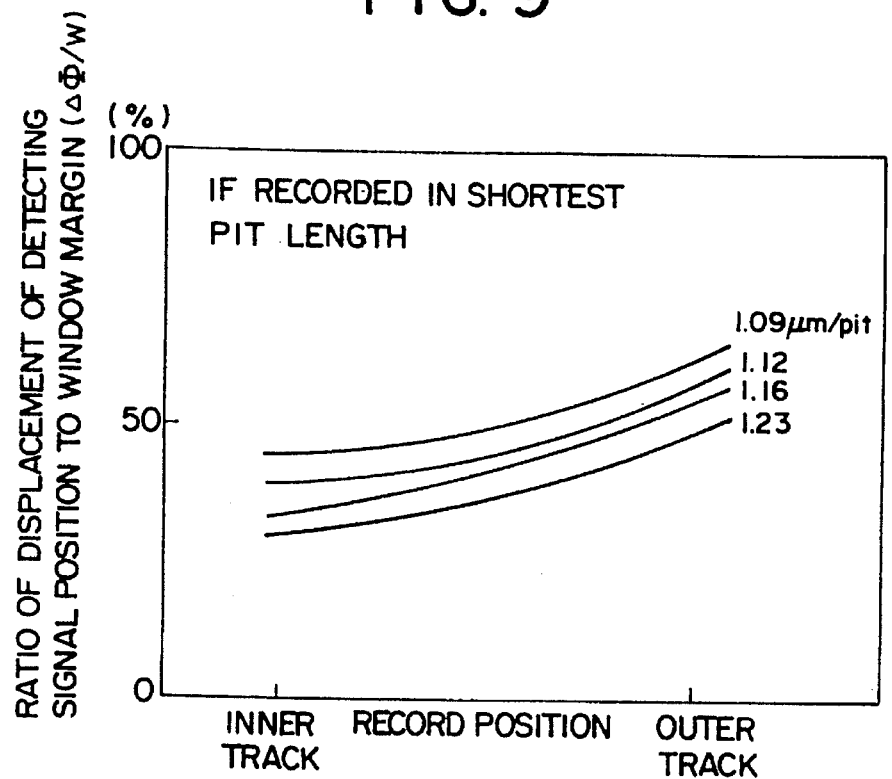
FIG. 9 is a graph showing the change of the ratio of displacement of the detection signal appearing position to a window margin.

In this prior art, since the variation $\Delta\Phi$ of the pit length to the record pit length on the outer track is larger than that on the inner track, the ratio $\Delta\Phi/W$ of displacement of the detection signal appearing position to the window margin W of the detecting clock 36 will become increased. FIG. 9 shows the change of the ratio $\Delta\Phi/W$ of displacement of the detection signal appearing position to the window margin when recording is performed in the same pit length throughout the inner and outer tracks of the optical disk medium 1.

As shown in FIG. 9, as the record position is nearer to the outer track side, the greater $\Delta\Phi/W$ becomes increased. Therefore there is a possibility that reproducing errors would be increased at the outer track.

The data recording and reproducing operations will now be described with reference to FIG. 1.

For recording data, the main control circuit 6 receives write data and position-to-start-writing information from the host computer 5, and then converts the position-to-start-writing information into accessible track and sector numbers 46, 47 according to a conversion table stored in a built-in memory (not shown). The positioning control circuit 18 controls the positioning device for positioning a light spot of the optical head 4 in the track number 46 transmitted from the main control circuit 6.

The way of positioning the optical head 4 in an object track is for example such that the information of an identification portion preformed in the sector 42 is used and an external scale is provided to read the located position by means of the scale detector 20.

Figures 10, 11:
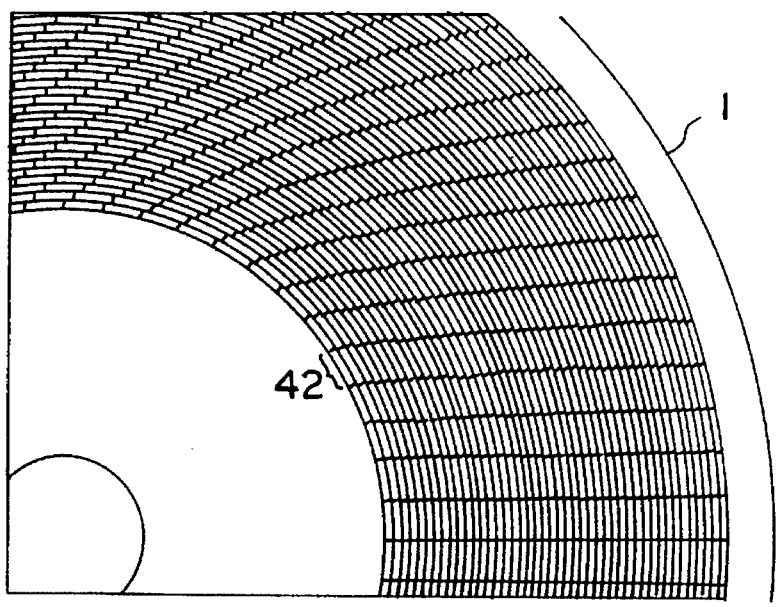
FIG. 10 is a diagram showing a conversion table of clock information.
FIG. 11 is a diagram showing the format of an optical disk medium associated with the conversion table of FIG. 10.

In the main control circuit 6, clock information 34 is obtained from the converted track number 46 by referring to the conversion table of FIG. 10 and is then sent to the synthesizer 8 where a record/reproducing clock 32 corresponding to the clock information 34 is generated.

In FIG. 10, the recording/reproducing clock switching position 41 is located at every 1024th track so that the pit length having the same information becomes longer as it is nearer to the outer track and so that the ratio ($\Delta\Phi/W$) of displacement of the detection signal appearing position to the window margin becomes smaller than when the pit length is constant. Of course the number of tracks should by no means be limited to this specific example, so long as it satisfies this condition.

The clock synthesizer 8, as shown in FIG. 12, divides the frequency of a basic clock 61 from the basic clock oscillator 7 by means of the fixed frequency divider 62 and issues a reference clock 64. Then the to-be-divided frequency of the variable frequency divider 63 is set by the clock information 34. The phase comparator 66 controls the frequency of an output signal 67 in such a manner that the frequency of a variable frequency-divided clock 65, as the output, and the reference clock 64 coincide with each other. The output signal 67 passes through the low-pass filter 68 and is then sent to the VCO circuit 69 where the output signal 67 becomes a recording/reproducing clock 32.

Furthermore, the recording/reproducing clock 32 is input to the variable frequency divider 63 to keep the frequency of the recording/reproducing clock 32 constant. As a result, the recording/reproducing clock 32 corresponds to the record position.

The modulation circuit 9 modulates the write data 21, which is received from the main control circuit 6, into code data 22 such as 2–7 code. The NRZ encoder 10 converts the code 22 into an NRZ code 23 by superimposing the code 22 on the recording/reproducing clock 32 generated by the synthesizer 8.

As described above, assuming that laser light is irradiated and recorded according to the NRZ code 23, a record pit length longer or shorter than the NRZ code 23 will be formed due to the thermal diffusing characteristic of the optical disk medium. This characteristic varies depending on the linear velocity, so it must be compensated or corrected to an optimum value. In order to make the record pit length equal to the code length of the NRZ code 23, the laser current which controls the record power of the laser is also needed to be optimized. For this purpose, in the pulse width setter 12, the pulse width of the NRZ code 23 is set while effecting the compensation to generate a record code 24.

Specifically, as shown in FIG. 13, the converted NRZ code 23 is input to the delay element 71 of the pulse width setter 12. The delay element 71 outputs signals with given delay times through the plural output taps. In an alternative way, gate delaying may be utilized.

The outputs of the delay element 71 are input to the selector 72 where one of the outputs is selected by the pulse width compensator 11 and is then input to one input of the AND gate 73. Since an undelayed signal is input to the other input of the AND gate 73, a pulse shortened by the amount of delay is generated. This resulting pulse corresponds to the record code 24 of FIGS. 1 and 4 and is input to the laser driver 14.

In this method, compensation is attained by shortening the pulse by means of the AND gate 73. Reversely, the pulse may be elongated to make compensation by using an OR gate instead of the AND gate 73. Also both the AND gate and the OR gate may be used in combination.

Meanwhile, the record light power is controlled by varying the value of a current source in the laser driver 14. The laser driver 14 has a current switch construction as described above and a light-emitting power produced when the semiconductor laser 77 is energized can be varied by changing the base potential of the transistor 75 for determining a current value with the D-A converter 74. For example, when the base potential of the transistor 75 is increased by the D-A converter 74, the emitter potential of the transistor 75 rises to increase a current flowing through the resistor 76. Therefore the driving current of the semiconductor laser 77 is also increased to increase the light-emitting power.

The pulse width compensator 11 performs setting of the pulse width and the light-emitting power according to the control data 33. Specifically, when the control data 33 such as clock information 34 (or a track number) is input to the pulse width compensator 11 as an address of the built-in ROM, the pulse width compensator 11 outputs corresponding compensated data. Using this data, it is possible to select the amount of compensation of the pulse width and also to designate the input bit to the D-A converter 74.

Instead of the clock information 34 and the track number, the value from the external scale detector 20 may be used. Otherwise, the number of tracks that have been crossed by the optical head 4 from the reference radius (e.g., the innermost track) of the disk until now is counted, and the so obtained number of tracks is used to recognize the position for attaining a similar control.

By this method, as shown in FIG. 4, the record light pulse 25 can be compensated to an optimum value in the record position so that a record pit 26 having a length corresponding to that of the NRZ code 23 can be formed on the disk medium 1.

For reproducing data, the main control circuit 6 performs, upon receipt of the position-to-start-reading information from the host computer 5, similar operation to that of the data recording, positioning the optical head 4 onto an object track. Then the main control circuit 6 regulates the light-emitting power of the semiconductor laser 77 to a reproduction level so as to irradiate laser light to the optical disk medium 1. Data in the optical disk medium 1 can thereby be obtained as an optical signal, which is then converted into a reproduction signal 27 by an optical detector (not shown) built in the optical head 4. The reproduction signal 27 is output, by the binary encoding circuit 15, as a reproduction signal 29, which is then input to the reproduction data composing circuit 16.

Meanwhile, the main control circuit 6 obtains the track number 46 and the clock information 34 from the position-to-start-reading information and then sends the clock information 34 to the synthesizer 8 where similarly to the recording operation, a recording/reproducing clock 32 is generated according to the clock information 34.

In this embodiment, the pit-edge record method is adopted as a data recording method. When the pit-edge recording is employed, a record pit has a variation in length with respect to an object length; therefore a front edge pulse and a rear edge pulse are regarded as individual data corresponding to the font and rear edges, respectively and the pulses are then synthesized again. The front and rear pulses correspond to the starting edge and the stopping edge of the reproduction code 29 output from the binary circuit 15, respectively.

In the PLL circuit 35, a detecting clock 37 synchronous with the reproduction code 29 and a synchronous code 36 are generated. In FIG. 1, the detecting clock 37 and the synchronous code 36 are shown each in a single route. Practically, however, they are each in two routes of clock and data corresponding to the front and rear edges, respectively. At this time, the recording/reproducing clock 32 is used as a reference clock for pulling-in of a VFO (Variable Frequency Oscillator) built in the PLL circuit 35.

The detecting clock 37 is a signal constituting a detecting window as shown in FIG. 8 and is synchronous with the recording/reproducing clock. Therefore the detecting clock 37 varies commensurate with the change of the recording/reproducing clock.

The output of the PLL circuit 35 is input to the reproduction data composing circuit 16. The reproduction data composing circuit 16 effects composition of the two data by timing the front-edge and rear-edge synchronous codes 36 by using detecting data (such as an SYNC pattern).

After the code 30 has been obtained as the output of the reproduction data composing circuit 16, the demodulation circuit 17 performs a series of operations whose sequence is opposite to that of the modulation, thereby obtaining data 31. This demodulation circuit 17 may be of a conventional type. The data reproduced by the foregoing method is transferred from the main control circuit 6 to the host computer 5.

FIG. 10 shows a conversion table of the track number 46, the clock information 34 and the recording/reproducing clock frequency 32. In this case, the recording/reproducing clock frequency 32 is changed at every 1024th track, and the number of sectors 42 constituting a track is increased by one for every clock switching position 41 toward the outer side of the disk.

Now, a recording/reproducing clock frequency $f_0$ in the innermost track (zero track) can be obtained by the equation:

$$f_0 = 2 \times (A/60) \times n \times Z \text{ (Hz)}$$

where $A_{rpm}$ is the number of rotations of the optical disk medium 1, n is the number of sectors in the innermost track, and Z is the total bit number in a sector.

Further, a recording/reproducing clock frequency $f_i$ according to clock information i can be obtained by the equation:

$$f_i = 2 \times (A/60) \times (n+1) \times Z \text{ (Hz)}$$

FIG. 11 shows a format of the optical disk medium 1 formed according to the conversion table of FIG. 10, in which format the track pitch d is 1.5 μm, the number n of sectors in the innermost track is 51, and the radius of the innermost track is 70 mm.

Figures 14, 15:
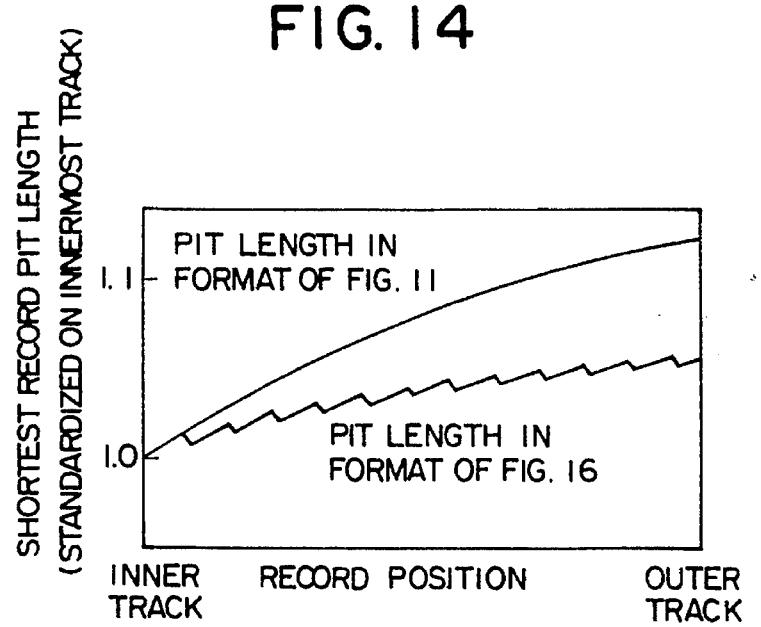
FIG. 14 is a graph showing the change of a shortest record pit length at a record/reproducing clock switching position.
FIG. 15 is a diagram showing a conversion table of clock information.

FIG. 14 shows the change of the shortest pit length of the optical disk medium 1 having the format of FIG. 11. This change of the shortest pit length indicates that the circumferential length of a data recording pit or of a record domain in the track of the corresponding or same order of precedence in each zone is increased gradually as the zone is nearer to the outermost zone. Here in this specification, tracks of the corresponding or same order of precedence in each zone means those arranged one contiguous to another radially outwardly and in the corresponding or same order of precedence from the innermost track, each track being in the same precedence. More specifically, the i-th track in each zone means, for example, a first track from the innermost track in each zone.

Another embodiment of the information recording and reproducing method will now be described.

In this embodiment, a degree of increase of the record pit length in each recording/reproducing clock frequency switching position 41 is made gentler or sharper than that in the format of FIG. 11. This degree can be controlled by varying the number of tracks for which the record clock frequency is switched instead of fixing to 1024, or by using a plurality of kinds, e.g., two kinds of track number in combination. If the degree of increase of the circumferential length of the record pit is kept down, then it is possible to increase the record capacity of the optical disk medium. More specifically, such zones that the circumferential length of a data recording pit or of a record domain is shorter than the circumferential length of the pit or record domain on the track of the same precedence in the respective inner adjacent zone are also provided with other zones on the optical disk medium 1. For example, in the optical disk medium 1 having a track pitch of 1.5 μm, three first zone for which recording/reproducing clocks are switched at every 1024th track are located successively, and second zones in which the clocks are switched are located at every 512th track. More particularly, under the condition that d=1.5 μm, n=51, and R=70 mm, the pit length on the outer zone is longer than that on the inner zone if N=1024. Under the same condition, if N=512, the pit length on the outer zone is shorter than that on the inner zone. Therefore it is possible to kept down the tendency to increase the pit length from the inner zone toward the outer zone.

A recording and/or reproducing apparatus for carrying out the method of this embodiment may be similar in construction to the optical disk system of FIG. 1. Therefore the description of the apparatus is omitted here. In this apparatus, a conversion table illustrated in FIG. 15 is stored in the main control circuit 6 constituting the clock information generator in the clock control system. This apparatus is different from the optical disk system of FIG. 1 in this point.

The conversion table of FIG. 15 comprises a table of the track number 46, the clock information 34 and the recording/reproducing clock frequency 32.

Figure 16:
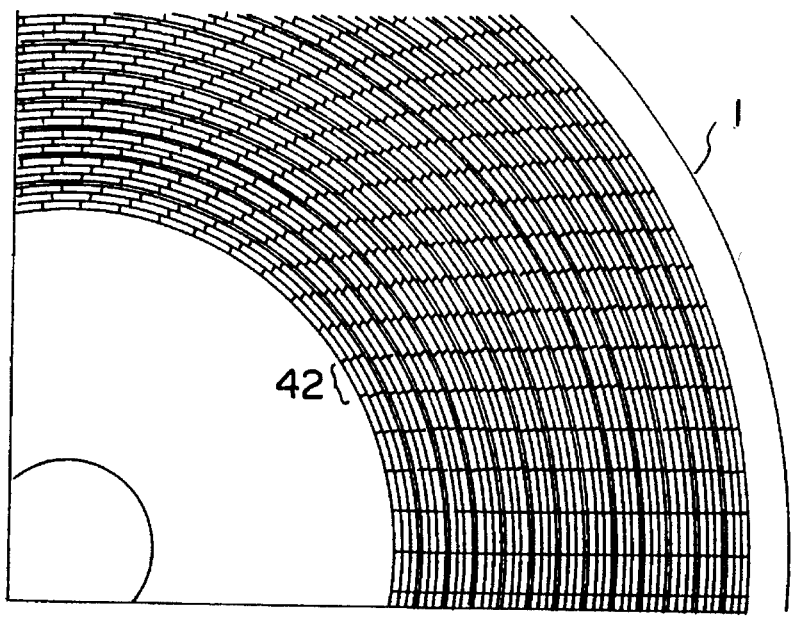
FIG. 16 is a diagram showing the format of an optical disk medium associated with the conversion table of FIG. 15.

FIG. 16 shows the format of an optical disk medium under the above-mentioned conditions. The change of the shortest pit length in the recording/reproducing clock switching position according to the format of FIG. 16 is represented by a sawtooth-shaped line in the graph of FIG. 14.

Also in this embodiment, like the foregoing embodiment, the recording/reproducing clocks 32 are switched for different number of tracks so that the recording/reproducing clock frequency suitable for stable reproducing can be selected, while increasing the record capacity.

In the illustrated embodiments, the recording/reproducing clock is changed firstly at every 1024th track and then at every 512th track. Thus, if each of these specific figures for tracks may be substituted with an n-th power of 2, it is possible to facilitate software processing and perform the processing at high speed. The present invention should by no means be limited to this embodiment.

Figure 17:
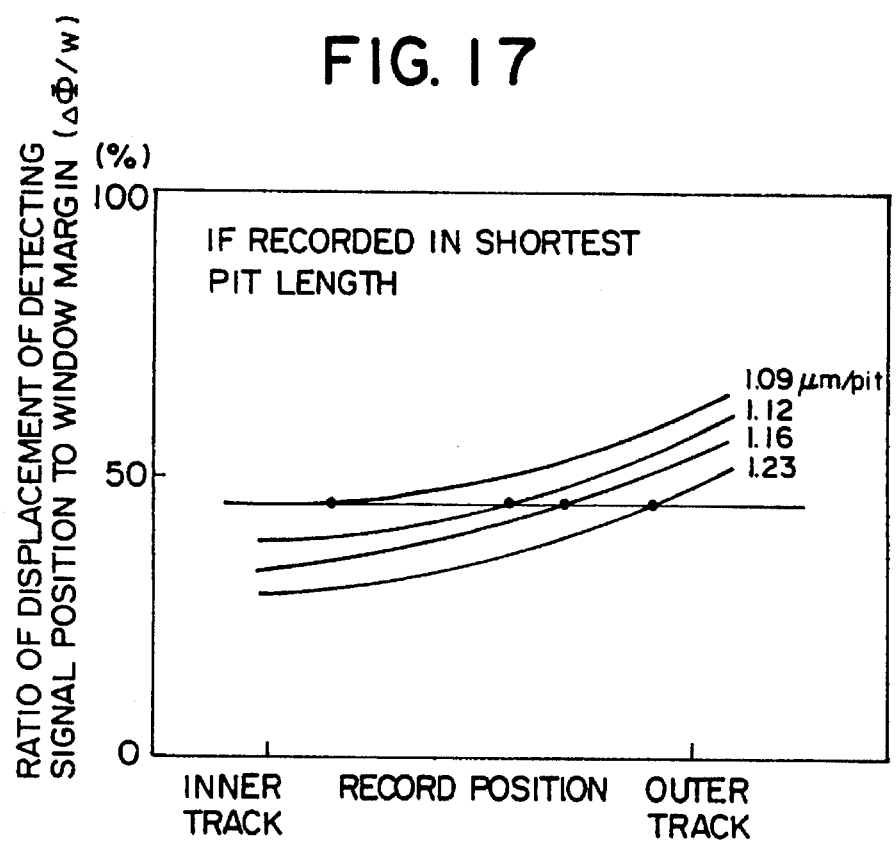
FIG. 17 is a graph showing the change of the ratio of displacement of the detection signal appearing position to a window margin.

Further, in this embodiment, the position where the recording/reproducing clock 32 is switched may be set as desired. In this case, the extent by which the record pit length is to be increased can be set as desired so that the ratio $\Delta\Phi/W$ of displacement $\Delta\Phi$ of the pit length to the window margin W can be substantially constant at any record position throughout the inner and outer zones. Therefore, it is possible to realize a maximum-density recording in which reading can be performed stably with a constant reading margin in every record position, FIG. 17 shows the ratio $\Delta\Phi/W$ of displacement of the detection signal appearing position to the detecting margin. As is apparent from FIG. 17, like the foregoing embodiments, the recording/reproducing clock frequency is set every zone or track in such a manner that the pit length is increased gradually as the record position is nearer to the outer side. So it is possible to keep the ratio $\Delta\Phi/W$ down substantially within a constant range. To the contrary, in order to set the ratio $\Delta\Phi/W$ in every record position so as to be equal to that on the inner zone, how large the shortest pit length should be and what value the recording/reproducing clock should be set to can also apparent.

Although the record medium is of a write-once-read-many type that oval pits are formed on a disk medium, the present invention should by no means be limited to this example; a rewritable type disk may also be used. Also, the record medium should not be limited to the illustrated example in which pits are formed for recording data, and may be a different optical disk medium such as a magneto-optical disk medium or phase-change disk medium, a magnetic disk medium, a flexible disk medium, or any other disk medium. Further, although the optical disk system of the illustrated embodiments has both the recording function and the reproducing function, the present invention may be applied separately to an optical disk system having only a recording function or only a reproducing function. Furthermore, the optical disk may be fixedly or exchangeably provided in the optical disk system of the present invention.

What is claimed is:

1. In a disk record medium having a record area wherein data recorded tracks are arranged, said record area divided radially into a plurality of zones each of which is formed of a preset number of tracks, and clocks of different frequencies are assigned respectively to said zones as a clock for reproducing data in the respective zone, said frequencies of clocks in the respective zones assigned so that the frequency becomes higher as the zone is nearer to an outer periphery of the medium, wherein minute regions where a physical change of the recording medium is caused are formed to effect the data recording by using an edge of the minute regions appearing on the track, a method for reproducing data from said medium comprising steps of:

generating a detection clock comprising pulses of a width W preset as a window for detecting said edge for each of the zones in synchronism with the clock respectively assigned to each zone;

detecting along tracks in the record medium the physical change on the tracks for reproducing in response to said detection clock;

producing a detection signal in response to said detecting;

further detecting an edge of said minute region from a changed point of said detection signal; and determining said changed point of the detecting signal as an edge of said minute region when said changed point is within said detecting window of said detection clock to effect detection of the edge.

2. A method for reproducing data according to claim 1, wherein said clock frequency in each zone is assigned so that a ratio ($\Delta\Phi/W$) of changed amount $\Delta\phi$ of the appearing position within the width of the window W when said changed point of the detecting signal appears within the detection window to said width of the window W is substantially the same in each zone.

3. A method for recording data on and/or reproducing data from a disk record medium having a record area in which a plurality of tracks for recording data are formed, and in each of the tracks minute regions are formed where a physical change of the recording medium is formed to effect recording of data by using an edge of the minute regions appearing on the track, said method comprising steps of:

dividing the record area radially into a plurality of zones which are formed with a preset number of tracks;

assigning a respective one of a plurality of clocks of different frequencies to each of the plurality of zones as a clock for recording and/or reproducing data in that respective zone, each clock comprising pulses of a width W preset as a window to record and/or reproduce using the edge for each of the zones in synchronism with the clock respectively assigned to each zone;

performing the data recording and/or reproducing using the clocks of the frequencies assigned to the respective zones and an edge of the minute regions;

assigning frequencies of said clocks so that a frequency in a zone is higher than a frequency in an inner adjacent zone; and setting each of said frequencies to a value such that a physical length of said minute region formed for recording data on the basis of the respective clock becomes longer for a first track of a first zone nearer an outer periphery of the medium, said first track located a predetermined number of tracks away from an innermost track of said first zone, relative to a second track of a second zone nearer an inner periphery of said medium, said second track located said predetermined number of tracks from an innermost track of said second zone, said minute regions on said first and second tracks being used for recording data having a same pattern.

4. A method for recording and/or reproducing data according to claim 3, said data reproducing further comprising steps of:

generating a detection clock comprising pulses of a width W preset as a window for detecting said edge for each of the zones in synchronism with the clock respectively assigned to each zone;

detecting along tracks in the record medium the physical change on the tracks for reproducing in response to said detection clock;

producing a detection signal in response to said detecting;

further detecting an edge of said minute region from a changed point of said detection signal; and determining said changed point of the detecting signal as an edge of said minute region when said changed point is within said detecting window of said detection clock to effect detection of the edge.

5. A method for recording and/or reproducing data according to claim 3, wherein said clock frequency in each zone is assigned so that a ratio ($\Delta\phi/W$) of changed amount $\Delta\phi$ of the appearing position within the width of the window W when said changed point of the detecting signal appears within the detection window to said width of the window W is substantially the same in each zone.

6. A method for recording and/or reproducing data according to claim 3, further comprising a step of varying the clock frequency between zones in a manner such that ratios ($\Delta\phi/W$) of changed amount $\Delta\phi$ of the appearing position within the width of the window W to said width of the window W for the zones are maintained within a range.

7. A method for recording and/or reproducing data according to claim 3, wherein ratios ($\Delta\phi/W$) of changed amount $\Delta\phi$ of the appearing position within the width of the window W to said width of the window W for the zones are maintained within a range.

8. A method for recording and/or reproducing data according to claim 3, wherein said data having a same pattern are one bit data.

9. A method for recording and/or reproducing data according to claim 3, wherein said minute region is a pit or a domain.

10. A data recording and/or reproducing method according to claim 3, wherein said zones comprise a plurality of kinds of zones, an individual zone of each kind including a different number of tracks.

11. A data recording and/or reproducing method according to claim 10, wherein a zone including a first number of tracks is located contiguous to a zone including a second number of tracks.

12. A data recording and/or reproducing method according to claim 11, wherein said second number is smaller than said first number.

13. A data processing system which is used with a disk record medium for executing data recording and/or reproducing, said disk record medium having a record area in which tracks for recording data are formed, and a minute region where physical change of the recording medium is formed on each of the tracks to effect the data recording by using an edge of the minute regions, said data processing system comprising:

a means for turning said disk record medium at a predetermined angular speed;

a clock control means for generating a clock and setting a desired frequency thereto to output the clock at a desired frequency, the clock comprising pulses of a width W preset as a window for each of the zones to record and/or reproduce using said edges in synchronism with the clock respectively assigned to each zone;

a record means for recording the data on each track on the basis of the clock output from said clock control means; and a reproducing means for reproducing the data on each track on the basis of the clock output from said clock control means;

said clock control means dividing the record area radially into a plurality of zones which are respectively formed with a preset number of tracks and assigning clocks of different frequencies, one to each of the zones, outputting a frequency clock to the track to be processed, and the frequency of the clock being identical to that of a zone in which said track belongs, said frequencies of said clocks being assigned so that the frequency in the outer zone of the periphery becomes higher as the zone is nearer to an outer periphery of the medium, and each of said frequencies being set to such a value that the physical length of said minute region formed for recording data on the basis of the clock of the frequency, becomes longer as the zone is nearer to an outer periphery of the medium when the minute regions on the tracks of same order counted from the innermost side of each zone used for recording the same pattern data are compared with each other.

14. A data processing system according to claim 13, wherein said clock control means generates a detection clock comprising pulses of a width W preset as a window for detecting said edge for each of the zones in synchronism with the clock respectively assigned to each zone; and said reproducing means further includes:

means for detecting along tracks in the record medium the physical change on the tracks for reproducing in response to said detection clock;

means for producing a detection signal in response to said detecting;

means for further detecting an edge of said minute region from a changed point of said detection signal; and means for determining said changed point of the detecting signal as an edge of said minute region when said changed point is within said detecting window of said detection clock to effect detection of the edge.

15. A data processing system according to claim 14, wherein said clock frequency in each zone is assigned so that a ratio ($\Delta\phi/W$) of changed amount $\Delta\phi$ of the appearing position within the width of the window W when said changed point of the detecting signal appears within the detection window to said width of the window W is substantially the same in each zone.

16. A data processing system according to claim 13, wherein said clock control means varies the clock frequency between zones in a manner such that ratios ($\Delta\phi/W$) of changed amount $\Delta\phi$ of the appearing position within the width of the window W to said width of the window W for the zones are maintained within a range.

17. A data processing system according to claim 13, wherein said clock control means maintains ratios ($\Delta\phi/W$) of changed amount $\Delta\phi$ of the appearing position within the width of the window W to said width of the window W for the zones within a range.

18. A data processing system according to claim 13, wherein the data having the same pattern on the tracks are one bit data.

19. A data processing system according to claim 13, wherein said minute region is a pit or a domain.

20. A data processing system according to claim 13, further comprising means for providing a code identifying the track to be accessed; said clock control means having a function for outputting, according to the code given thereto, clock information representing the zone to which the track to be accessed belongs, and a function for outputting, based on said clock information, a clock of a frequency corresponding to the track to be accessed.

21. A data processing system according to claim 20, wherein the clock-information outputting function has a conversion table in which the code identifying each individual track is associated with clock information indicating a zone to which the individual track belongs.

22. A data processing system according to claim 21, wherein said conversion table stores the clock frequencies such that each track has a larger record capacity for tracks nearer to the outer zone, and wherein said conversion table outputs the clock information designating a value such that the circumferential length of the minute region formed on the track of the same order of precedence in each zone for the data of the same pattern becomes larger as the zone is nearer to the outer zone.

23. A data processing system according to claim 13, wherein said clock control means includes a basic clock oscillator for generating a basic clock, a clock-information generating means for outputting the clock information designating the frequency assigned to each zone in accordance with an access position, and a synthesizer for generating, based on the basic clock and the clock information output by the clock-information generating means, an object record/reproducing clock from said basic clock.

24. A data processing system according to claim 23, further including means for detecting the access position on the record medium, said clock-information generating means having a function for setting, based on the result of detection, a clock of a frequency corresponding to the access position.

25. A method for reproducing data from a disk recording medium having a record area said medium comprising;

tracks for recording data in said record area;

a minute region in each of the tracks where physical change of the recording medium is formed, an edge of said minute region being used for recording of data; and a plurality of zones in said record area in which a preset number of tracks are included, said zones divided radially in the record medium, each zone having a corresponding clock frequency at which data is recorded and/or reproduced, wherein the clock comprises pulses of a width W preset as a window for recording and/or reproducing data using the edge of the minute region for each of the zones in synchronism with the clock respectively assigned to each zone;

said minute region being a physical length formed for recording data on the basis of a clock frequency, which becomes longer in zones nearer an outer periphery of the medium when the minute regions on tracks of same order counted from an innermost side of each zone used for recording the same pattern data are compared with each other, comprising the steps of:

generating a detection clock comprising pulses of a width W preset as a window for detecting said edge for each of the zones in synchronism with the clock respectively assigned to each zone;

detecting along tracks in the record medium the physical change on the tracks for reproducing in response to said detection clock;

producing a detection signal in response to said detecting;

further detecting an edge of said minute region from a changed point of said detection signal; and determining said changed point of the detecting signal as an edge of said minute region when said changed point is within said detecting window of said detection clock to effect detection of the edge.

26. A method according to claim 25, wherein the clock frequency in each zone is assigned so that a ratio ($\Delta\phi/W$) of changed amount $\Delta\phi$ of the appearing position within the width of the window W when said changed point of the detecting signal appears within the detection window to said width of the window W is substantially the same in each zone.

27. A disk recording medium having a record area, said medium comprising:

tracks for recording data in said record area;

a minute region in each of the tracks where physical change of the recording medium is formed, an edge of said minute region being used for recording of data; and a plurality of zones in said record area in which a preset number of tracks are included, said zones divided radially in the record medium, each zone having a corresponding clock frequency at which data is recorded and/or reproduced, wherein the clock comprises pulses of a width W preset as a window for recording and/or reproducing data using the edge of the minute region for each of the zones in synchronism with the clock respectively assigned to each zone;

said minute region being a physical length formed for recording data on the basis of a clock frequency, which becomes longer in zones nearer an outer periphery of the medium when the minute regions on tracks of same order counted from an innermost side of each zone used for recording the same pattern data are compared with each other.

28. A disk recording medium having a record area according to claim 27, wherein the clock frequency is varied between zones in a manner such that ratios ($\Delta\phi$/W) of changed amount $\Delta\phi$ of the appearing position within the width of the window W to said width of the window W for the zones are maintained within a range.

29. A disk recording medium having a record area according to claim 27, wherein ratios ($\Delta\phi$/W) of changed amount $\Delta\phi$ of the appearing position within the width of the window W to said width of the window W for the zones are maintained within a range.

30. A disk recording medium according to claim 27, wherein a number of tracks included in each zone is a power of two.

31. A disk recording medium according to claim 27, wherein the recording medium is an optical disk.

32. A disk recording medium according to claim 27, wherein said minute region is a pit.

33. A disk recording medium according to claim 31, wherein said minute region is a pit.

* * * * *

UNITED STATES PATENT AND TRADEMARK OFFICE
CERTIFICATE OF CORRECTION

PATENT NO.   : 5,524,103
DATED        : 4 June 1996
INVENTOR(S)  : Kikuo SHIMIZU et al.

It is certified that error appears in the above-indentified patent and that said Letters Patent is hereby corrected as shown below:

| Column | Line | |
|--------|------|---|
| 4 | 38 | Change "medicare" to --medium--. |
| 4 | 65 | Change "et" to --a--. |
| 6 | 30 | After "loop" insert --)--. |
| 7 | 67 | Before "present" insert --the--. |

Signed and Sealed this

Nineteenth Day of November, 1996

Attest:

BRUCE LEHMAN

Attesting Officer        Commissioner of Patents and Trademarks